United States Patent
Yan et al.

(10) Patent No.: US 11,876,378 B1
(45) Date of Patent: Jan. 16, 2024

(54) WIND FARM CONTROL STRATEGY METHOD, APPARATUS AND DEVICE, AND STORAGE MEDIUM

(71) Applicant: North China Electric Power University, Beijing (CN)

(72) Inventors: Jie Yan, Beijing (CN); Shukai He, Beijing (CN); Hangyu Wang, Beijing (CN); Yongqian Liu, Beijing (CN); Shuang Han, Beijing (CN); Li Li, Beijing (CN); Hang Meng, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/220,853

(22) Filed: Jul. 12, 2023

(30) Foreign Application Priority Data

Jul. 12, 2022 (CN) .......................... 202210814187.3

(51) Int. Cl.
*H02J 3/38* (2006.01)
*H02J 3/00* (2006.01)

(52) U.S. Cl.
CPC .............. *H02J 3/381* (2013.01); *H02J 3/004* (2020.01); *H02J 2203/20* (2020.01); *H02J 2300/28* (2020.01)

(58) Field of Classification Search
CPC ........ H02J 3/381; H02J 3/004; H02J 2203/20; H02J 2300/28
See application file for complete search history.

(56) References Cited

U.S. PATENT DOCUMENTS

2012/0133138 A1  5/2012  Soerensen et al.

FOREIGN PATENT DOCUMENTS

| CN | 101852172 A |   | 10/2010 |
|---|---|---|---|
| CN | 102570449 A | * | 7/2012 |
| CN | 102570453 A |   | 7/2012 |
| CN | 111342499 A |   | 6/2020 |
| CN | 114021822 A |   | 2/2022 |

OTHER PUBLICATIONS

Yang Zhichao, et al., Maximum Output Optimal Control of Wind Farm Based on Wake Effect, Electric Power Construction, 2017, pp. 96-102, vol. 38 No.4.

* cited by examiner

*Primary Examiner* — Charles Cai
(74) *Attorney, Agent, or Firm* — Bayramoglu Law Offices LLC (57) ABSTRACT

A wind farm control strategy method, apparatus and device, and a storage medium are provided. The method includes: acquiring incoming flow wind data of a target wind farm, a restriction relationship between wind turbines in the target wind farm and current working condition data of the wind turbines in the target wind farm; inputting the incoming flow wind data, the restriction relationship and the current working condition data into a pre-trained working condition prediction model to obtain target working condition data corresponding to a target generation power of the target wind farm, the target generation power being a maximum generation power of the target wind farm; and controlling operation of the wind turbines in the target wind farm based on the target working condition data.

16 Claims, 3 Drawing Sheets

WIND FARM CONTROL STRATEGY METHOD, APPARATUS AND DEVICE, AND STORAGE MEDIUM

CROSS REFERENCE TO THE RELATED APPLICATIONS

This application is based upon and claims priority to Chinese Patent Application No. 202210814187.3, filed on Jul. 12, 2022, the entire contents of which are incorporated herein by reference.

TECHNICAL FIELD

The present disclosure relates to the field of wind power generation technologies, and more particularly, to a wind farm control strategy method, apparatus and device, and a storage medium.

BACKGROUND

A wind turbine in a wind farm is a power generation apparatus for converting wind energy in the air into electric energy in the wind farm. When an upstream wind turbine acquires wind energy from wind, a wake area where a wind speed is decreased is formed in a downstream wind turbine at the same time, reducing a power generation capacity of the downstream wind turbine located in the wake area, thus reducing an overall power generation capacity of the wind farm.

In order to maximize the output power of the wind farm, it is usually to control the wind turbines in the wind farm, thus reducing the wake effect. However, when the operation of the wind turbines is controlled on the basis of the existing wind farm control strategy methods, only a maximum power generation capacity of a single wind turbine is considered, and the maximum power generation capacity of the single wind turbine cannot represent a maximum overall power generation capacity of the wind farm. Therefore, it is an urgent technical problem to be solved to provide a wind farm control strategy method capable of improving the overall power generation capacity of the wind farm.

SUMMARY

In order to solve the above technical problems or at least partially solve the above technical problems, the present disclosure provides a wind farm control strategy method, apparatus and device, and a storage medium.

According to a first aspect, the present disclosure provides a wind farm control strategy method. The method includes:

acquiring incoming flow wind data of a target wind farm, a restriction relationship between wind turbines in the target wind farm and current working condition data of the wind turbines in the target wind farm;

inputting the incoming flow wind data, the restriction relationship and the current working condition data into a pre-trained working condition prediction model to obtain target working condition data corresponding to target generation power of the target wind farm, where the target generation power is maximum generation power of the target wind farm; and controlling operation of the wind turbines in the target wind farm based on the target working condition data.

According to a second aspect, the present disclosure provides a wind farm control strategy apparatus. The apparatus includes:

a data acquisition module configured for acquiring incoming flow wind data of a target wind farm, a restriction relationship between wind turbines in the target wind farm and current working condition data of the wind turbines in the target wind farm;

a target working condition data determination module configured for inputting the incoming flow wind data, the restriction relationship and the current working condition data into a pre-trained working condition prediction model to obtain target working condition data corresponding to target generation power of the target wind farm, where the target generation power is maximum generation power of the target wind farm; and an operation control module configured for controlling operation of the wind turbines in the target wind farm based on the target working condition data.

According to a third aspect, the embodiments of the present disclosure provide a wind farm control strategy device. The device includes:

one or more a processors; and a storage apparatus, configured for storing one or more programs, where:

the one or more programs, when being executed by the one or more processors, cause the one or more processors to implement the wind farm control strategy method provided in the first aspect.

According to a fourth aspect, the embodiments of the present disclosure further provide a computer readable storage medium storing a computer program thereon, where the computer program, when being executed by a processor, implements the wind farm control strategy method provided in the first aspect.

Compared with the prior art, the technical solutions provided by the embodiments of the present disclosure have the following advantages.

In the wind farm control strategy method, apparatus and device, and the storage medium according to the embodiments of the present disclosure, the incoming flow wind data of the target wind farm, the restriction relationship between wind turbines in the target wind farm and the current working condition data of the wind turbines in the target wind farm are acquired first. Then, the incoming flow wind data, the restriction relationship and the current working condition data are input into the pre-trained working condition prediction model to obtain the target working condition data corresponding to the target generation power of the target wind farm, where the target generation power is the maximum generation power of the target wind farm. Finally, the operation of the wind turbines in the target wind farm is controlled based on the target working condition data. Through the above process, the pre-trained working condition prediction model may be used to predict the target working condition data corresponding to the maximum generation power of the target wind farm in real time. Therefore, when the target working condition data is used to control the operation of the wind turbines in the target wind farm, output power of the target wind farm can be maximized, a wake effect of the wind farm is reduced, an overall power generation capacity of the wind farm is improved, and finally online optimization of the wake effect of the wind farm is realized.

BRIEF DESCRIPTION OF THE DRAWINGS

The accompanying drawings herein are incorporated into the specification and constitute a part of the specification, show the embodiments consistent with the present disclosure, and serve to explain the principles of the present disclosure together with the specification.

In order to illustrate the technical solutions in the embodiments of the present disclosure or the prior art more clearly, the accompanying drawings to be used in the description of the embodiments or the prior art will be briefly described below. Obviously, those of ordinary skills in the art can also obtain other drawings based on these drawings without going through any creative work.

DETAILED DESCRIPTION OF THE EMBODIMENTS

In order to better understand the above objects, features and advantages of the present disclosure, the solutions of the present disclosure will be further described below. It should be noted that, in case of no conflict, the embodiments in the present disclosure and the features in the embodiments may be combined with each other.

In the following description, many specific details are set forth in order to fully understand the present disclosure, but the present disclosure may be implemented in other ways different from those described herein. Obviously, the embodiments described in the specification are merely a part of, rather than all of, the embodiments of the present disclosure.

In order to maximize the use of wind energy resources and meet the economic feasibility, current wind farm construction tends to be centralized and large-scale. This construction method may reduce the construction cost, but also produce a wake effect, which will lead to the reduction of the overall power generation capacity of the wind farm.

In order to improve the overall power generation capacity of the wind farm, the current wind farm control strategy method only considers the maximum power generation capacity of a single wind turbine, without considering the wake affect between the wind turbines, which makes the maximum power generation of the single wind turbine not represent maximum overall power generation capacity of the wind farm. Therefore, based on the current wind farm control strategy method, it is impossible to ensure the maximum power generation capacity output of the wind farm.

In order to solve the above problems, the embodiments of the present disclosure provide a wind farm control strategy method and device, and a storage medium capable of improving an overall power generation capacity of a wind farm.

A wind farm control strategy method provided by the embodiments of the present disclosure will be described below with reference to FIGS. 1 to 3.

Figure 1:
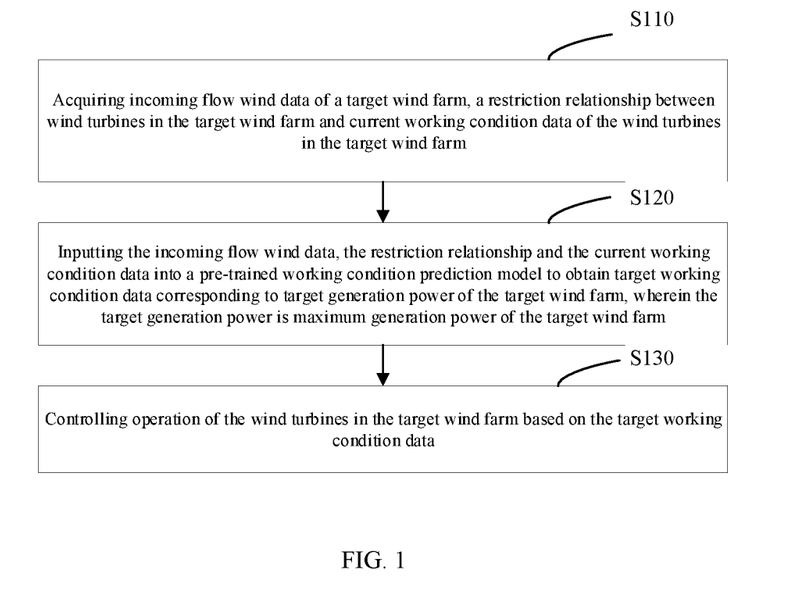
FIG. 1 is a schematic flow chart diagram of a wind farm control strategy method provided by the embodiments of the present disclosure.

FIG. 1 shows a schematic flow chart diagram of a wind farm control strategy method provided by the embodiments of the present disclosure.

In the embodiments of the present disclosure, the wind farm control strategy method shown in FIG. 1 may be executed by a wind farm control strategy device. The wind farm control strategy device may be an electronic device or a server. The electronic device may include, but is not limited to a fixed terminal such as a smart phone, a notebook computer, a desktop computer and the like. The server may be a device with storage and computing functions such as a cloud server or a server cluster. The embodiments of the present disclosure are explained in detail with the electronic device as an execution body.

As shown in FIG. 1, the wind farm control strategy method may include the following steps.

At S110, incoming flow wind data of a target wind farm, a restriction relationship between wind turbines in the target wind farm and current working condition data of the wind turbines in the target wind farm are acquired.

In the embodiments of the present disclosure, when it is necessary to improve the power generation capacity of the wind farm, the electronic device may acquire the incoming flow wind data of the target wind farm, the restriction relationship between the wind turbines and the current working condition data of the wind turbines, so that optimal working condition data of the target wind farm can be predicted based on the incoming flow wind data, the restriction relationship between the wind turbines and the current working condition data of the wind turbines. In this way, the target wind farm can output the maximum power generation capacity based on the optimal working condition data.

In the embodiments of the present disclosure, the target wind farm may be any large-scale wind farm that needs power generation capacity optimization.

The target wind farm may include a plurality of wind turbines, and each wind turbine can generate wind power according to the distribution of the wind data.

In the embodiments of the present disclosure, the incoming flow wind data may be inlet wind data of the wind farm.

Optionally, the incoming flow wind data may be wind data in a recent period of time or wind data in a future period of time. The incoming flow wind data may be an average value of the wind data or a wind sequence.

Specifically, the incoming flow wind data may include wind speed data, wind direction data and turbulence data.

In the embodiments of the present disclosure, the restriction relationship between the wind turbines in the target wind farm may be a wake influence relationship between the wind turbines.

In some embodiments, the restriction relationship may be a power generation capacity influence relationship between wind turbine generators.

In other embodiments, the restriction relationship may be a p location relationship of the wind turbine generators.

In still other embodiments, the restriction relationship may be a wake area influence relationship between the wind turbine generators.

In yet another embodiments, the restriction relationship may include at least two of the power generation capacity influence relationship, the location relationship and the wake area influence relationship of the wind turbine generators.

In the embodiments of the present disclosure, the current working condition data may be current operating parameters of the wind turbines in the target wind farm before working condition prediction. Specifically, the current working condition data may be used as a restriction condition of the predicted working condition data, so that deviation between the predicted working condition data and the current working condition data may not be too large, thus avoiding excessive adjustment of the working condition of the wind turbines.

Optionally, the current working condition data may include at least one of a yaw angle, a rotating speed and a pitch angle.

At S120, the incoming flow wind data, the restriction relationship and the current working condition data are input into a pre-trained working condition prediction model to obtain target working condition data corresponding to target generation power of the target wind farm, where the target generation power is maximum generation power of the target wind farm.

In the embodiments of the present disclosure, after acquiring the above data, the electronic device may acquire the pre-trained working condition prediction model of the target wind farm, directly input the acquired data into the working condition prediction model, and use the working condition prediction model to predict the target working condition data corresponding to the maximum generation power of the target wind farm, thus obtaining optimum working conditions of the wind turbines in the target wind farm.

In the embodiments of the present disclosure, the target generation power may be the sample generation power when training the working condition prediction model, and the sample generation power is the maximum generation power under different sample wind time series data when training the working condition prediction model.

In the embodiments of the present disclosure, the target working condition data may be optimal operating parameters for controlling the wind turbines of the target wind farm, that is, when the target wind farm operates based on the target working condition data, the output power generation capacity is maximum. Moreover, the target working condition data is the optimal working condition with a small difference from the current working condition data. Specifically, when a plurality of optimal working conditions are predicted by the working condition prediction model, the working condition having the smallest difference with the current working condition data may be selected from the plurality of optimal working conditions as the target working condition data.

Optionally, the target working condition data may include at least one of target yaw angles, target rotating speed and target pitch angles of the wind turbines in the target wind farm.

In this way, in the embodiments of the present disclosure, when it is necessary to optimize the power generation capacity of the wind farm, the trained working condition prediction model may be used to accurately predict the target working condition data, thereby obtaining the optimal working condition of the wind farm, such that the target wind farm can output the maximum power generation capacity based on the optimal working condition. Moreover, the optimal working condition may be directly obtained by the working condition prediction model, the prediction process of the optimal working condition is simple and takes a short time. Therefore, a real-time control effect of on-line optimization of the wind farm can be realized.

At S130, operation of the wind turbines in the target wind farm is controlled based on the target working condition data.

In the embodiments of the present disclosure, after determining the target working condition data, the electronic device may control the operation of the wind turbines in the target wind farm based on the target working condition data, so that the wind turbines can generate electricity based on the optimal working condition, such that the output power of the target wind farm is maximized, thus improving the overall power generation capacity of the wind farm.

Specifically, the wind turbines in the target wind farm can generate electricity based on the respective yaw angles, the rotating speeds and the pitch angles in the corresponding target working condition data, so that the target wind farm can output the maximum power.

In the embodiments of the present disclosure, the incoming flow wind data of the target wind farm, the restriction relationship between wind turbines in the target wind farm and the current working condition data of the wind turbines in the target wind farm are acquired first. Then, the incoming flow wind data, the restriction relationship and the current working condition data are input into the pre-trained working condition prediction model to obtain the target working condition data corresponding to the target generation power of the target wind farm, where the target generation power is the maximum generation power of the target wind farm. Finally, the operation of the wind turbines in the target wind farm is controlled based on the target working condition data. Through the above process, the pre-trained working condition prediction model may be used to predict the target working condition data corresponding to the maximum generation power of the target wind farm in real time. Therefore, when the target working condition data is used to control the operation of the wind turbines in the target wind farm, output power of the target wind farm can be maximized, and a wake effect of the wind farm is reduced. Therefore, an overall power generation capacity of the wind farm is improved, and finally online optimization of the wake effect of the wind farm is realized.

In order to improve model precision of the working condition prediction model, after S130, the method further includes the following steps of:
  acquiring actual generation power of the wind turbines in the target wind farm and actual working condition data corresponding to the actual generation power;
  calculating a sum of the actual generation power to obtain actual generation power of the target wind farm; and
  when a power difference between the target generation power and the actual generation power of the target wind farm is greater than a preset difference threshold, updating the working condition prediction model according to the incoming flow wind data, the restriction relationship between the wind turbines in the target wind farm, the current working condition data of the wind turbines in the target wind farm and the actual working condition data corresponding to the actual generation power to obtain an updated working condition prediction model.

The actual generation power may be the actual power generation capacity of the wind turbines in the target wind farm.

The actual working condition data may be the actual operational parameter of the wind turbines in the target wind farm.

The preset difference threshold may be a predetermined value used for judging a difference between the actual generation power of the target wind farm and the target generation power.

Specifically, when the power difference between the target generation power and the actual generation power of the target wind farm is greater than the preset difference threshold, the incoming flow wind data, the restriction relationship between the wind turbines in the target wind farm, and the current working condition data of the wind turbines in the target wind farm are used as input data of the working condition prediction model, and the actual working condition data corresponding to the actual generation power is used as output data of the working condition prediction model, and the working condition prediction model is updated based on the input data and the output data above to obtain the updated working condition prediction model. Further, after the updated working condition prediction model is obtained, the incoming flow wind data, the restriction relationship and the current working condition data are input into the updated working condition prediction model to obtain new target working condition data, such that the operation of the wind turbines in the target wind farm is controlled based on the new target working condition data.

It should be noted that, when the actual generation power is greater than the target generation power, the actual generation power may be used as the target generation power of the target wind farm, thus obtaining new target generation power corresponding to the working condition prediction model, and enabling the working condition prediction model to predict new target working condition data based on the new target generation power, and controlling the operation of the wind turbines in the target wind farm based on the new target working condition data.

In this way, in the embodiments of the present disclosure, during the operation process of the working condition prediction model, the working condition prediction model may be updated based on the actual operation data of the target wind farm, so that the model precision of the updated working condition prediction model is higher, and the updated working condition prediction model is more suitable for a power generation situation of the target wind farm.

In another embodiment of the present disclosure, in order to ensure that the target working condition data can be predicted by using the working condition prediction model, the working condition prediction model may be trained before performing S110.

Figure 2:
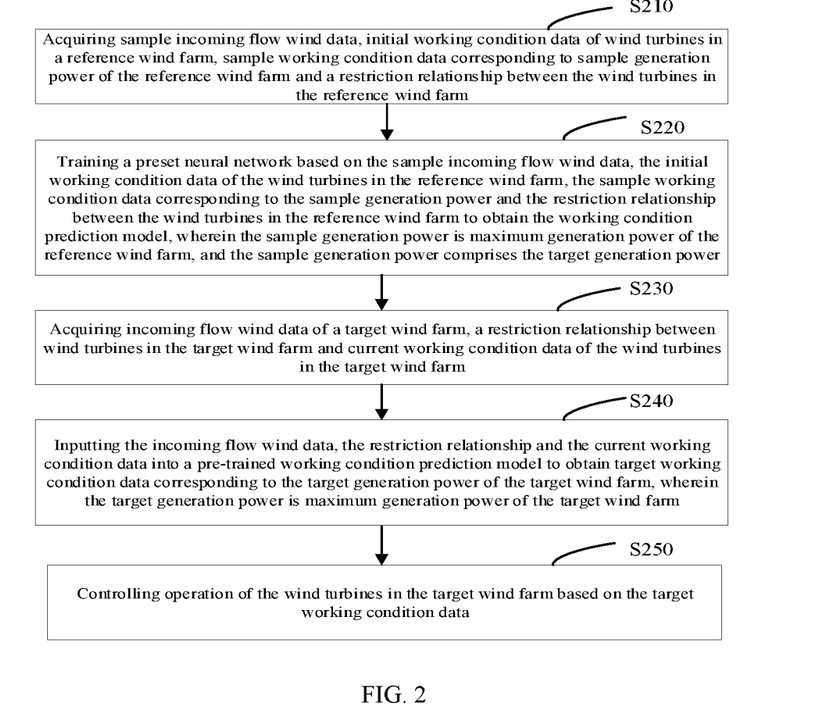
FIG. 2 is a schematic flow chart diagram of another wind farm control strategy method provided by the embodiments of the present disclosure.

FIG. 2 shows a schematic flow chart diagram of another wind farm control strategy method provided by the embodiments of the present disclosure.

As shown in FIG. 2, the wind farm control strategy method may include the following steps.

At S210, sample incoming flow wind data, initial working condition data of wind turbines in a reference wind farm, sample working condition data corresponding to sample generation power of the reference wind farm and a restriction relationship between the wind turbines in the reference wind farm are acquired.

In the embodiments of the present disclosure, when it is necessary to train a working condition prediction model, an electronic device can acquire sample data. The sample data includes the sample incoming wind data, the initial working condition data of the wind turbines in the reference wind farm, the sample working condition data corresponding to the sample generation power of the reference wind farm, and the restriction relationship between the wind turbines in the reference wind farm, so that the model is trained by using the above sample data.

In the embodiments of the present disclosure, the sample incoming flow wind data may be inlet wind data of the reference wind farm.

Specifically, the sample wind data may include wind speed data Ws, wind direction data Wd and turbulence Tur.

Optionally, the wind speed data may be in a range of $\{Ws_{min}, Ws_{max}\}$ and the wind direction data Ws may be in a range of $\{Wd_{min}, Wd_{max}\}$.

In the embodiments of the present disclosure, the reference wind farm may be different wind farms in the training sample, and the sample wind farm may include the target wind farm.

In the embodiments of the present disclosure, the initial working condition data may be disclosed by the wind turbines before the sample working condition data is obtained.

In the embodiments of the present disclosure, the restriction relationship between the wind turbines in the reference wind farm may also be a wake influence relationship between the wind turbines.

In the embodiments of the present disclosure, the sample working condition data corresponding to the sample generation power may be optimal operating parameters used for controlling the wind turbines of the reference wind farm. That is to say, when the reference wind farm operates based on the target operating condition data, the power generation capacity output is maximum. Moreover, the sample working condition data is the optimal working condition data with smallest difference from the initial working condition data.

Optionally, the sample working condition data may include at least one of sample yaw angles Yg, sample rotating speed and sample pitch angles of the wind turbines in the reference wind farm.

In the embodiments of the present disclosure, optionally, the "acquiring the sample working condition data corresponding to the sample generation power of the reference wind farm" in S210 may specifically include the following steps:

S2101: simulating the sample incoming flow wind data and the initial working condition data of the wind turbines in the reference wind farm by using a preset wind farm simulation model to obtain the generation power of the wind turbines in the reference wind farm; and S2102: adjusting the initial working condition data of the wind turbines in the reference wind farm according to the sample generation power and a sum of the generation power of the wind turbines in the reference wind farm to obtain the sample working condition data corresponding to the sample generation power of the reference wind farm.

The preset wind farm simulation model may be constructed by operation simulation models corresponding to the wind turbines. Specifically, the preset wind farm simulation model may calculate the wind data at hubs of the wind turbines and the initial working condition data of the wind turbines in the reference wind farm according to the sample incoming flow wind data, input the wind data at the hubs of the wind turbines and the initial working condition data of the wind turbines into the operation simulation models corresponding to the wind turbines, and calculate the generation power of the wind turbines by using the operation simulation models corresponding to the wind turbines.

S2102 may specifically include the following step of:

adjusting the sum of the generation power of the wind turbines to the sample generation power, so that the initial working condition data of the wind turbines in the reference wind farm is adjusted to the sample working condition data corresponding to the sample generation power of the reference wind farm.

Specifically, an optimization algorithm may be used to optimize the sum of the generation power of the wind turbines to the sample generation power, so that the initial working condition data of the wind turbines in the reference wind farm can be optimized into the sample working condition data corresponding to the sample generation power of the reference wind farm, and sample public data corresponding to the sample generation power can be obtained.

Optionally, the optimization algorithm may include any one of particle swarm optimization, reinforcement learning and minimization limit (SLSQP).

In the embodiments of the present disclosure, optionally, the "acquiring the restriction relationship between the wind turbines in the reference wind farm" in S210 may specifically include at least one of the following methods:

acquiring a power generation capacity influence relationship between the wind turbines in the reference wind farm to obtain the restriction relationship between the wind turbines in the reference wind farm;

acquiring a location relationship between the wind turbines in the reference wind farm to obtain the restriction relationship between the wind turbines in the reference wind farm; and acquiring a wake area influence relationship between the wind turbines in the reference wind farm to obtain the restriction relationship between the wind turbines in the reference wind farm.

The power generation capacity influence relationship may be used to characterize a power generation capacity relationship between upstream wind turbines and downstream wind turbines, and the power generation capacity influence relationship may be directly regarded as the restriction relationship between the wind turbines.

The location relationship may be used to characterize a location influence relationship between the upstream wind turbines and the downstream wind turbines, and the location relationship may be directly regarded as the restriction relationship between the wind turbines.

The wake area influence relationship may be used to characterize the wake influence of the upstream wind turbines on the downstream wind turbines, and the wake area influence relationship may be directly used as the restriction relationship between the wind turbines.

Further, after obtaining the training data above, the training data may be normalized, so that the normalized training data may be used for model training. Meanwhile, the normalized training data may be divided into a training set and a test set according to a set ratio, where the set ratio may be 8:2 or 7:3.

At S220, a preset neural network is trained based on the sample incoming flow wind data, the initial working condition data of the wind turbines in the reference wind farm, the sample working condition data corresponding to the sample generation power and the restriction relationship between the wind turbines in the reference wind farm to obtain the working condition prediction model, where the sample generation power is maximum generation power of the reference wind farm, and the sample generation power includes the target generation power.

In the embodiments of the present disclosure, optionally, S220 may specifically include the following steps of:

S2201: inputting the sample incoming flow wind data, the initial working condition data of the wind turbines in the reference wind farm, the sample working condition data corresponding to the sample generation power and the restriction relationship between the wind turbines in the reference wind farm into the preset neural network to obtain estimated working condition data and estimated generation power corresponding to the estimated working condition data;

S2202: calculating a loss function of the preset neural network based on at least one of the estimated generation power and the estimated working condition data and at least one of the sample generation power and the sample working condition data; and S2203: iteratively adjusting the preset neural network based on the loss function until the loss function is less than a preset threshold to obtain the working condition prediction model.

In some embodiments, the loss function of the preset neural network may be calculated according to the estimated generation power and the sample generation power.

In other embodiments, the loss function of the preset neural network may be calculated according to the estimated working condition data and the sample working condition data.

In still other embodiments, a first loss function is calculated according to the estimated generation power and the sample generation power first, and a second loss function is calculated according to the estimated working condition data and the sample working condition data. Then, the first loss function and the second loss function are weighted and summed to obtain the loss function of the preset neural network.

In order to master the accuracy of the working condition prediction model, after the trained working condition prediction model is obtained, the trained working condition prediction model may be tested with test samples. If the trained working condition prediction model passes the test, the working condition prediction model may be deployed and applied.

Therefore, in the embodiments of the present disclosure, the working condition prediction model may be trained in an offline state based on the sample data, and then the trained working condition prediction model may be deployed, so that an optimal control strategy of the wind farm can be fitted more quickly and accurately by using the working condition prediction model, thus reducing the wake effect, improving the power generation capacity of the wind farm, and finally improving the economic benefit of the wind farm.

At S230, incoming flow wind data of a target wind farm, a restriction relationship between wind turbines in the target wind farm and current working condition data of the wind turbines in the target wind farm are acquired.

At S240, the incoming flow wind data, the restriction relationship and the current working condition data are input into a pre-trained working condition prediction model to obtain target working condition data corresponding to the target generation power of the target wind farm, where the target generation power is maximum generation power of the target wind farm.

At S250, operation of the wind turbines in the target wind farm is controlled based on the target working condition data.

S230-S250 are similar to S110-S130 and will not be elaborated herein.

Figure 3:
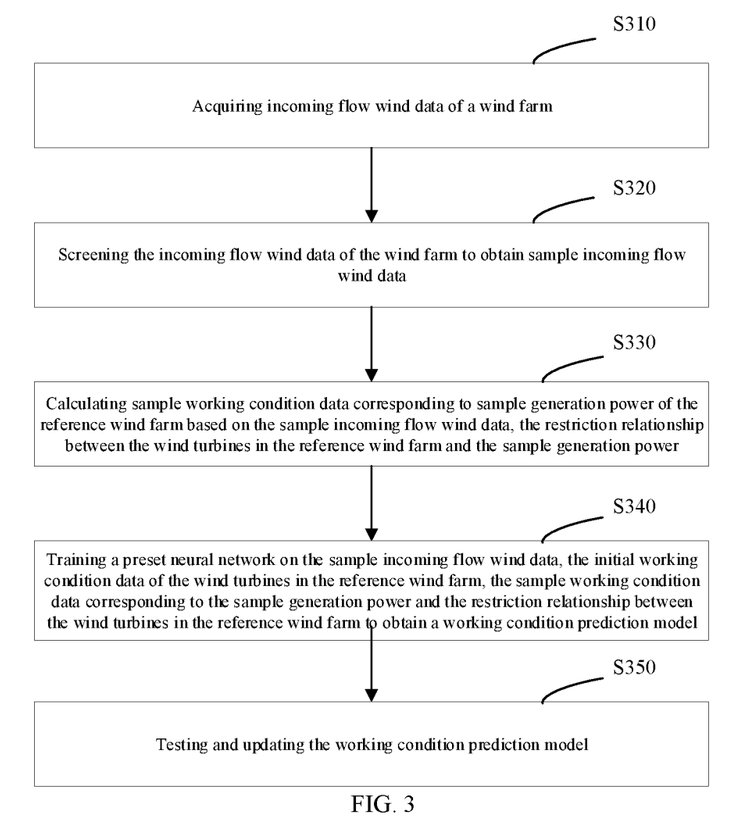
FIG. 3 is a logic schematic diagram of a wind farm control strategy method provided by the embodiments of the present disclosure.

In order to facilitate understanding a training process of the working condition prediction model, FIG. 3 shows a logic schematic diagram of the working condition prediction model provided by the embodiments of the present disclosure.

As shown in FIG. 3, a training method of the working condition prediction model includes the following steps.

At S310, incoming flow wind data of a wind farm is acquired.

The incoming flow wind data of the wind farm may be incoming wind data of the wind farm in a past period of time.

At S320, the incoming flow wind data of the wind farm is screened to obtain sample incoming flow wind data.

Specifically, invalid data in the incoming flow wind data of the wind farm may be eliminated to obtain the sample incoming flow wind data.

At S330, sample working condition data corresponding to sample generation power of a reference wind farm is calculated based on the sample incoming flow wind data, a restriction relationship between wind turbines in a reference wind farm, and sample generation power.

S330 is similar to the training method for the working condition prediction model in the above embodiment, and will not be repeated here.

At S340, a preset neural network is trained based on the sample incoming flow wind data, the initial working condition data of the wind turbines in the reference wind farm, the sample working condition data corresponding to the sample generation power and the restriction relationship between the wind turbines in the reference wind farm to obtain a working condition prediction model.

S340 is similar to S220 and will not be elaborated herein.

At S350, the working condition prediction model is tested and updated.

Specifically, a test sample may be used to test the working condition prediction model, and the data in the operation process may be used to update the working condition prediction model to obtain the updated working condition prediction model.

The embodiments of the present disclosure further provide a wind farm control strategy apparatus for realizing the above wind farm control strategy method, which will be described below with reference to FIG. 4. In the embodiments of the present disclosure, the wind farm control strategy apparatus may be an electronic device. The electronic device may be a mobile terminal, a tablet computer and other device with communication functions.

Figure 4:
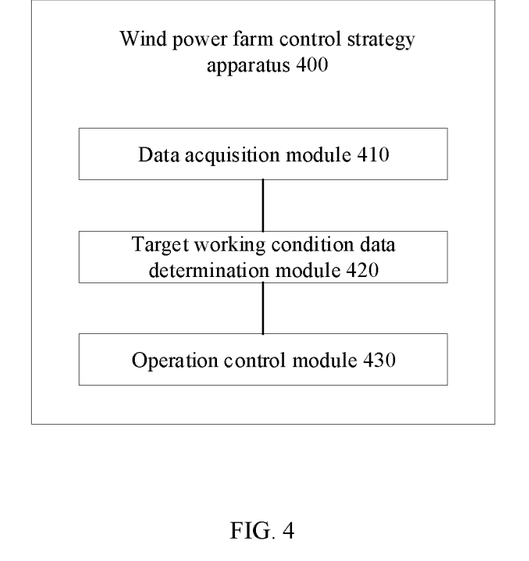
FIG. 4 is a structural schematic diagram of a wind farm control strategy apparatus provided by the embodiments of the present disclosure.

FIG. 4 shows a structural schematic diagram of a wind farm control strategy apparatus provided by the embodiments of the present disclosure.

As shown in FIG. 4, the wind farm control strategy apparatus 400 may include: a data acquisition module 410, a target working condition data determination module 420 and an operation control module 430.

The data acquisition module 410 is configured for acquiring incoming flow wind data of a target wind farm, a restriction relationship between wind turbines in the target wind farm and current working condition data of the wind turbines in the target wind farm.

The target working condition data determination module 420 is configured for inputting the incoming flow wind data, the restriction relationship and the current working condition data into a pre-trained working condition prediction model to obtain target working condition data corresponding to target generation power of the target wind farm, where the target generation power is maximum generation power of the target wind farm.

The operation control module 430 is configured for controlling operation of the wind turbines in the target wind farm based on the target working condition data.

In the embodiments of the present disclosure, the incoming flow wind data of the target wind farm, the restriction relationship between wind turbines in the target wind farm and the current working condition data of the wind turbines in the target wind farm are acquired first. Then, the incoming flow wind data, the restriction relationship and the current working condition data are input into the pre-trained working condition prediction model to obtain the target working condition data corresponding to the target generation power of the target wind farm, where the target generation power is the maximum generation power of the target wind farm. Finally, the operation of the wind turbines in the target wind farm is controlled based on the target working condition data. Through the above process, the pre-trained working condition prediction model may be used to predict the target working condition data corresponding to the maximum generation power of the target wind farm in real time. Therefore, when the target working condition data is used to control the operation of the wind turbines in the target wind farm, output power of the target wind farm can be maximized, and a wake effect of the wind farm is reduced. Therefore, an overall power generation capacity of the wind farm is improved, and finally online optimization of the wake effect of the wind farm is realized.

In some embodiments, the apparatus may further include: a model training module, where the model training module includes:

a sample data acquisition unit configured for acquiring sample incoming flow wind data, initial working condition data of wind turbines in a reference wind farm, sample working condition data corresponding to sample generation power of the reference wind farm and a restriction relationship between the wind turbines in the reference wind farm; and a model training unit configured for training a preset neural network based on the sample incoming flow wind data, the initial working condition data of the wind turbines in the reference wind farm, the sample working condition data corresponding to the sample generation power and the restriction relationship between the wind turbines in the reference wind farm to obtain the working condition prediction model, where the sample generation power is maximum generation power of the reference wind farm, and the sample generation power includes the target generation power.

In some embodiments, the sample acquisition unit is specifically configured for simulating the sample incoming flow wind data and the initial working condition data of the wind turbines in the reference wind farm by using a preset wind farm simulation model to obtain the generation power of the wind turbines in the reference wind farm; and adjusting the initial working condition data of the wind turbines in the reference wind farm according to the sample generation power and a sum of the generation power of the wind turbines in the reference wind farm to obtain the sample working condition data corresponding to the sample generation power of the reference wind farm.

In some embodiments, the sample acquisition unit is specifically configured for adjusting the sum of the generation power of the wind turbines to the sample generation power, so that the initial working condition data of the wind turbines in the reference wind farm is adjusted to the sample working condition data corresponding to the sample generation power of the reference wind farm.

In some embodiments, the sample acquisition unit is specifically configured for acquiring a power generation capacity influence relationship between the wind turbines in the reference wind farm to obtain the restriction relationship between the wind turbines in the reference wind farm;
  acquiring a location relationship between the wind turbines in the reference wind farm to obtain the restriction relationship between the wind turbines in the reference wind farm; and
  acquiring a wake area influence relationship between the wind turbines in the reference wind farm to obtain the restriction relationship between the wind turbines in the reference wind farm.

In some embodiments, the model training unit is specifically configured for inputting the sample incoming flow wind data, the initial working condition data of the wind turbines in the reference wind farm, the sample working condition data corresponding to the sample generation power and the restriction relationship between the wind turbines in the reference wind farm into the preset neural network to obtain estimated working condition data and estimated generation power corresponding to the estimated working condition data;
  calculating a loss function of the preset neural network based on at least one of the estimated generation power and the estimated working condition data and at least one of the sample generation power and the sample working condition data; and
  iteratively adjusting the preset neural network based on the loss function until the loss function is less than a preset threshold to obtain the working condition prediction model.

In some embodiments, the device further includes:
an actual operation data acquisition module configured for acquiring actual generation power of the wind turbines in the target wind farm and actual working condition data corresponding to the actual generation power;
an actual generation power calculation module configured for calculating a sum of the actual generation power to obtain actual generation power of the target wind farm; and
a model updating module configured for, when a power difference between the target generation power and the actual generation power of the target wind farm is greater than a preset difference threshold, updating the working condition prediction model according to the incoming flow wind data, the restriction relationship between the wind turbines in the target wind farm, the current working condition data of the wind turbines in the target wind farm and the actual working condition data to obtain an updated working condition prediction model.

It should be noted that the wind farm control strategy apparatus shown in FIG. 4 can execute the various steps in the method embodiments shown in FIGS. 1 to 3, and realize various processes and effects in the method or system embodiments shown in FIGS. 1 to 3, which are not repeated here.

Figure 5:
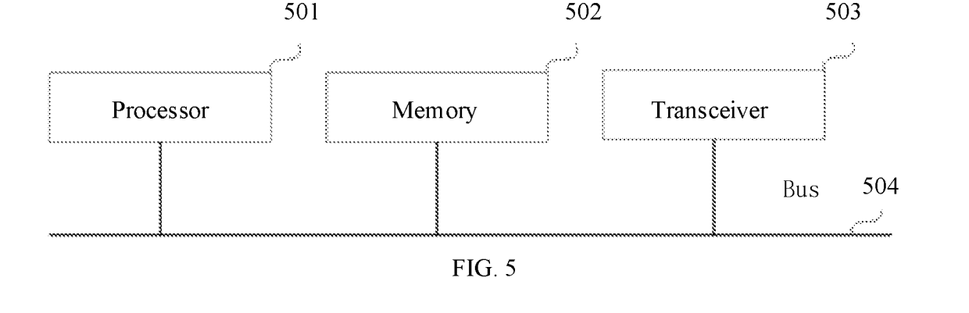
FIG. 5 is a schematic structural diagram of a wind farm control strategy device provided by the embodiments of the present disclosure.

FIG. 5 shows a structural schematic diagram of a wind farm control strategy device provided by the embodiments of the present disclosure.

As shown in FIG. 5, the wind farm control strategy device may include a processor 501 and a memory 502 storing computer program instructions.

Specifically, the processor 501 may include a Central Processing Unit (CPU), or an Application Specific Integrated Circuit (ASIC), or may be configured to implement one or more integrated circuits of the embodiments of the present application.

The storage 502 may include a mass memory for information or instructions. By way of example and not limitation, the memory 502 may include a Hard Disk Drive (HDD), a floppy disk drive, a flash memory, an optical disc, a magneto-optical disc, a magnetic tape, or a Universal Serial Bus (USB) driver, or a combination of two or more of these. In appropriate cases, the memory 502 may include removable or non-removable (or fixed) media. In appropriate cases, the memory 502 may be internal or external to an integrated gateway device. In a particular embodiment, the memory 502 is a non-volatile solid state memory. In a particular embodiment, the storage 502 includes a Read-Only Memory (ROM). In appropriate cases, the ROM may be a mask programmed ROM, a programmable ROM (PROM), an Electrical Programmable ROM (EPROM), an Electrically Erasable Programmable ROM (EEPROM), an Electrically Alterable ROM (EAROM) or a flash memory, or a combination of two or more of these.

The processor 501 reads and executes the computer program instructions stored in the memory 502 to execute the steps of the wind farm control strategy method provided by the embodiments of the present disclosure.

In one example, the wind farm control strategy device may further include a transceiver 503 and a bus 504. As shown in FIG. 5, the processor 501, the memory 502 and the transceiver 503 are connected and complete communication with each other through the bus 504.

The bus 504 includes hardware, software, or both. By way of example and not limitation, the bus may include an Accelerated Graphics Port (AGP) or other graphics bus, an Extended Industry Standard Architecture (EISA) bus, a Front Side BUS (FSB), a Hyper Transport (HT) interconnect, an Industrial Standard Architecture (ISA) bus, an infinite bandwidth interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus or other suitable bus or a combination of two or more of these. In appropriate cases, the bus 504 may include one or more buses. Although the embodiments of the present application describe and show a specific bus, any suitable bus or interconnect is considered in the present application.

The following is an embodiment of a computer readable storage medium provided by the embodiments of the present disclosure. The computer readable storage medium belongs to the same inventive concept as the wind farm control strategy method of the above-mentioned embodiments. For details not described in detail in the embodiment of the computer readable storage medium, please refer to the above-mentioned embodiments of the wind farm control strategy method.

The embodiment provides a storage medium containing a computer-executable instruction, where the computer-executable instruction, when executed by a computer processor, is configured for executing a wind farm control strategy method. The method includes:
  acquiring incoming flow wind data of a target wind farm, a restriction relationship between wind turbines in the target wind farm and current working condition data of the wind turbines in the target wind farm;
  inputting the incoming flow wind data, the restriction relationship and the current working condition data into a pre-trained working condition prediction model to obtain target working condition data corresponding to target generation power of the target wind farm, where the target generation power is maximum generation power of the target wind farm; and controlling operation of the wind turbines in the target wind farm based on the target working condition data.

Certainly, as for the storage medium containing the computer-executable instruction provided by the embodiments of the present disclosure, the computer-executable instruction is not limited to the above method operations, and may also perform related operations in the wind farm control strategy method provided by any embodiment of the present disclosure.

Through the description of the above embodiments, those skilled in the art can clearly understand that the present disclosure can be implemented by means of software plus necessary general hardware, and certainly, can be implemented by means of hardware, but in many cases, the former is a better implementation manner. Based on such understanding, the technical solutions of the present disclosure in essence or the part contributed to the related art may be embodied in the form of a software product which is stored in a computer readable storage medium such as a floppy disc of a computer, a Read-Only Memory (ROM), a Random Access Memory (RAM), a Flash (FLASH), a hard disk, or an optical disk which include a plurality of instructions such that one computer device (which may be a personal computer, a server, or a network cloud platform, etc.) performs the wind farm control strategy methods described in each of the embodiments of the present disclosure.

It should be noted that the above are only the preferred embodiments of the present disclosure and the applied technical principles. Those skilled in the art will understand that the present disclosure is not limited to the specific embodiments herein, and various obvious changes, readjustments and substitutions can be made by those skilled in the art without departing from the scope of protection of the present disclosure. Therefore, although the present disclosure has been explained in detail through the above embodiments, the present disclosure is not limited to the above embodiments, but may include many other equivalent embodiments without departing from the concept of the present disclosure, and the scope of the present disclosure is determined by the scope of the appended claims.

What is claimed is:

1. A wind farm control strategy method, comprising:
    acquiring incoming flow wind data of a target wind farm, a restriction relationship between wind turbines in the target wind farm and current working condition data of the wind turbines in the target wind farm, wherein the restriction relationship between the wind turbines in the target wind farm is a wake influence relationship between the wind turbines;
    inputting the incoming flow wind data, the restriction relationship and the current working condition data into a pre-trained working condition prediction model to obtain target working condition data corresponding to a target generation power of the target wind farm, wherein the target generation power is a maximum generation power of the target wind farm; and
    controlling an operation of the wind turbines in the target wind farm based on the target working condition data;
    wherein, a training method of the working condition prediction model comprises the following steps of:
    acquiring sample incoming flow wind data, initial working condition data of wind turbines in a reference wind farm, sample working condition data corresponding to a sample generation power of the reference wind farm and a restriction relationship between the wind turbines in the reference wind farm, wherein the restriction relationship between the wind turbines in the reference wind farm is a wake influence relationship among the wind turbines in the reference wind farm; and
    training a preset neural network based on the sample incoming flow wind data, the initial working condition data of the wind turbines in the reference wind farm, the sample working condition data corresponding to the sample generation power and the restriction relationship between the wind turbines in the reference wind farm to obtain the working condition prediction model, wherein the sample generation power is a maximum generation power of the reference wind farm, and the sample generation power comprises the target generation power; and
    the operation of acquiring the sample working condition data corresponding to the sample generation power of the reference wind farm, comprises:
    simulating the sample incoming flow wind data and the initial working condition data of the wind turbines in the reference wind farm by using a preset wind farm simulation model to obtain generation power of the wind turbines in the reference wind farm; and
    adjusting the initial working condition data of the wind turbines in the reference wind f am according to the sample generation power and a sum of the generation power of the wind turbines in the reference wind farm to obtain the sample working condition data corresponding to the sample generation power of the reference wind farm.

2. The method according to claim 1, wherein the operation of adjusting the initial working condition data of the wind turbines in the reference wind farm according to the sample generation power and the sum of the generation power of the wind turbines in the reference wind farm to obtain the sample working condition data corresponding to the sample generation power of the reference wind farm, comprises:
    adjusting the sum of the generation power of the wind turbines to the sample generation power, so that the initial working condition data of the wind turbines in the reference wind farm is adjusted to the sample working condition data corresponding to the sample generation power of the reference wind farm.

3. The method according to claim 1, wherein the operation of acquiring the restriction relationship between the wind turbines in the reference wind farm, comprises at least one of the following methods:
    acquiring a power generation capacity influence relationship between the wind turbines in the reference wind farm to obtain the restriction relationship between the wind turbines in the reference wind farm;
    acquiring a location relationship between the wind turbines in the reference wind farm to obtain the restriction relationship between the wind turbines in the reference wind farm; and
    acquiring a wake area influence relationship between the wind turbines in the reference wind farm to obtain the restriction relationship between the wind turbines in the reference wind farm.

4. The method according to claim 1, wherein the operation of training the preset neural network based on the sample incoming flow wind data, the initial working condition data of the wind turbines in the reference wind farm, the sample working condition data corresponding to the sample generation power and the restriction relationship between the wind turbines in the reference wind farm to obtain the working condition prediction model, comprises:

inputting the sample incoming flow wind data, the initial working condition data of the wind turbines in the reference wind farm, the sample working condition data corresponding to the sample generation power and the restriction relationship between the wind turbines in the reference wind farm into the preset neural network to obtain estimated working condition data and estimated generation power corresponding to the estimated working condition data;

calculating a loss function of the preset neural network based on at least one of the estimated generation power and the estimated working condition data and at least one of the sample generation power and the sample working condition data; and iteratively adjusting the preset neural network based on the loss function until the loss function is less than a preset threshold to obtain the working condition prediction model.

5. The method according to claim 1, wherein after controlling the operation of the wind turbines in the target wind farm based on the target working condition data, the method further comprises:

acquiring actual generation power of the wind turbines in the target wind farm and actual working condition data corresponding to the actual generation power;

calculating a sum of the actual generation power to obtain an actual generation power of the target wind farm; and when a power difference between the target generation power and the actual generation power of the target wind farm is greater than a preset difference threshold, updating the working condition prediction model according to the incoming flow wind data, the restriction relationship between the wind turbines in the target wind farm, the current working condition data of the wind turbines in the target wind farm and the actual working condition data to obtain an updated working condition prediction model.

6. A wind farm control strategy apparatus, comprising:

a data acquisition module configured for acquiring incoming flow wind data of a target wind farm, a restriction relationship between wind turbines in the target wind farm and current working condition data of the wind turbines in the target wind farm, wherein the restriction relationship between the wind turbines in the target wind farm is a wake influence relationship between the wind turbines;

a target working condition data determination module configured for inputting the incoming flow wind data, the restriction relationship and the current working condition data into a pre-trained working condition prediction model to obtain target working condition data corresponding to a target generation power of the target wind farm, wherein the target generation power is a maximum generation power of the target wind farm; and an operation control module configured for controlling an operation of the wind turbines in the target wind farm based on the target working condition data;

wherein the wind farm control strategy apparatus further comprises: a model training module; and the model training module comprises:

a sample data acquisition unit configured for acquiring sample incoming flow wind data, initial working condition data of wind turbines in a reference wind farm, sample working condition data corresponding to a sample generation power of the reference wind farm and a restriction relationship between the wind turbines in the reference wind farm, wherein the restriction relationship between the wind turbines in the reference wind farm is a wake influence relationship among the wind turbines in the reference wind farm; and a model training unit configured for training a preset neural network based on the sample incoming flow wind data, the initial working condition data of the wind turbines in the reference wind farm, the sample working condition data corresponding to the sample generation power and the restriction relationship between the wind turbines in the reference wind farm to obtain the working condition prediction model, wherein the sample generation power is a maximum generation power of the reference wind farm, and the sample generation power comprises the target generation power; and wherein the sample data acquisition unit is configured for simulating the sample incoming flow wind data and the initial working condition data of the wind turbines in the reference wind farm by using a preset wind farm simulation model to obtain generation power of the wind turbines in the reference wind farm; and adjusting the initial working condition data of the wind turbines in the reference wind f am according to the sample generation power and a sum of the generation power of the wind turbines in the reference wind farm to obtain the sample working condition data corresponding to the sample generation power of the reference wind farm.

7. A wind farm control strategy device, comprising:

a processor; and a memory configured for storing an executable instruction;

wherein, the processor is configured for reading the executable instruction from the memory and executing the executable instruction to realize the wind farm control strategy method according to claim 1.

8. A non-transitory computer readable storage medium storing a computer program, wherein the storage medium stores a computer program which, when executed by a processor, causes the processor to realize the wind farm control strategy method according to claim 1.

9. The wind farm control strategy device according to claim 7, wherein in the wind farm control strategy method, the operation of adjusting the initial working condition data of the wind turbines in the reference wind farm according to the sample generation power and the sum of the generation power of the wind turbines in the reference wind farm to obtain the sample working condition data corresponding to the sample generation power of the reference wind farm, comprises:

adjusting the sum of the generation power of the wind turbines to the sample generation power, so that the initial working condition data of the wind turbines in the reference wind farm is adjusted to the sample working condition data corresponding to the sample generation power of the reference wind farm.

10. The wind farm control strategy device according to claim 7, wherein in the wind farm control strategy method, the operation of acquiring the restriction relationship between the wind turbines in the reference wind farm, comprises at least one of the following methods:

acquiring a power generation capacity influence relationship between the wind turbines in the reference wind farm to obtain the restriction relationship between the wind turbines in the reference wind farm;

acquiring a location relationship between the wind turbines in the reference wind farm to obtain the restriction relationship between the wind turbines in the reference wind farm; and acquiring a wake area influence relationship between the wind turbines in the reference wind farm to obtain the restriction relationship between the wind turbines in the reference wind farm.

11. The wind farm control strategy device according to claim 7, wherein in the wind farm control strategy method, the operation of training the preset neural network based on the sample incoming flow wind data, the initial working condition data of the wind turbines in the reference wind farm, the sample working condition data corresponding to the sample generation power and the restriction relationship between the wind turbines in the reference wind farm to obtain the working condition prediction model, comprises:

inputting the sample incoming flow wind data, the initial working condition data of the wind turbines in the reference wind farm, the sample working condition data corresponding to the sample generation power and the restriction relationship between the wind turbines in the reference wind farm into the preset neural network to obtain estimated working condition data and estimated generation power corresponding to the estimated working condition data;

calculating a loss function of the preset neural network based on at least one of the estimated generation power and the estimated working condition data and at least one of the sample generation power and the sample working condition data; and iteratively adjusting the preset neural network based on the loss function until the loss function is less than a preset threshold to obtain the working condition prediction model.

12. The wind farm control strategy device according to claim 7, wherein in the wind farm control strategy method, after controlling the operation of the wind turbines in the target wind farm based on the target working condition data, the method further comprises:

acquiring an actual generation power of the wind turbines in the target wind farm and actual working condition data corresponding to the actual generation power;

calculating a sum of the actual generation power to obtain an actual generation power of the target wind farm; and when a power difference between the target generation power and the actual generation power of the target wind farm is greater than a preset difference threshold, updating the working condition prediction model according to the incoming flow wind data, the restriction relationship between the wind turbines in the target wind farm, the current working condition data of the wind turbines in the target wind farm and the actual working condition data to obtain an updated working condition prediction model.

13. The non-transitory computer readable storage medium according to claim 8, wherein in the wind farm control strategy method, the operation of adjusting the initial working condition data of the wind turbines in the reference wind farm according to the sample generation power and the sum of the generation power of the wind turbines in the reference wind farm to obtain the sample working condition data corresponding to the sample generation power of the reference wind farm, comprises:

adjusting the sum of the generation power of the wind turbines to the sample generation power, so that the initial working condition data of the wind turbines in the reference wind farm is adjusted to the sample working condition data corresponding to the sample generation power of the reference wind farm.

14. The non-transitory computer readable storage medium according to claim 8, wherein in the wind farm control strategy method, the operation of acquiring the restriction relationship between the wind turbines in the reference wind farm, comprises at least one of the following methods:

acquiring a power generation capacity influence relationship between the wind turbines in the reference wind farm to obtain the restriction relationship between the wind turbines in the reference wind farm;

acquiring a location relationship between the wind turbines in the reference wind farm to obtain the restriction relationship between the wind turbines in the reference wind farm; and acquiring a wake area influence relationship between the wind turbines in the reference wind farm to obtain the restriction relationship between the wind turbines in the reference wind farm.

15. The non-transitory computer readable storage medium according to claim 8, wherein in the wind farm control strategy method, the operation of training the preset neural network based on the sample incoming flow wind data, the initial working condition data of the wind turbines in the reference wind farm, the sample working condition data corresponding to the sample generation power and the restriction relationship between the wind turbines in the reference wind farm to obtain the working condition prediction model, comprises:

inputting the sample incoming flow wind data, the initial working condition data of the wind turbines in the reference wind farm, the sample working condition data corresponding to the sample generation power and the restriction relationship between the wind turbines in the reference wind farm into the preset neural network to obtain estimated working condition data and estimated generation power corresponding to the estimated working condition data;

calculating a loss function of the preset neural network based on at least one of the estimated generation power and the estimated working condition data and at least one of the sample generation power and the sample working condition data; and iteratively adjusting the preset neural network based on the loss function until the loss function is less than a preset threshold to obtain the working condition prediction model.

16. The non-transitory computer readable storage medium according to claim 8, wherein in the wind farm control strategy method, after controlling the operation of the wind turbines in the target wind farm based on the target working condition data, the method further comprises:

acquiring an actual generation power of the wind turbines in the target wind farm and actual working condition data corresponding to the actual generation power;

calculating a sum of the actual generation power to obtain an actual generation power of the target wind farm; and when a power difference between the target generation power and the actual generation power of the target wind farm is greater than a preset difference threshold, updating the working condition prediction model according to the incoming flow wind data, the restriction relationship between the wind turbines in the target wind farm, the current working condition data of the wind turbines in the target wind farm and the actual working condition data to obtain an updated working condition prediction model.

\* \* \* \* \*